United States Patent [19]

Sentsui et al.

[11] Patent Number: 5,202,746
[45] Date of Patent: Apr. 13, 1993

[54] METHOD AND APPARATUS FOR IDENTIFYING AN OPTICAL TRANSMISSION MEDIUM

[75] Inventors: Shintaro Sentsui, Chiba; Akira Fujisaki, Ichibawa; Haruki Ogoshi, Yokohama; Morinobu Mizutani, Tokyo; Mitsuo Miyazaki, Tokyo, all of Japan

[73] Assignees: The Furukawa Electric Co., Ltd.; The Tokyo Electric Power Co., Incorporated, both of Tokyo, Japan

[21] Appl. No.: 487,045

[22] Filed: Mar. 2, 1990

[30] Foreign Application Priority Data

| Mar. 2, 1989 | [JP] | Japan | 1-50680 |
| Mar. 2, 1989 | [JP] | Japan | 1-50681 |
| Nov. 16, 1989 | [JP] | Japan | 1-298595 |
| Nov. 16, 1989 | [JP] | Japan | 1-298596 |

[51] Int. Cl.⁵ .................. G01N 21/84; G01N 21/21
[52] U.S. Cl. .................. 356/73.1; 250/227.17
[58] Field of Search .................. 356/73.1; 250/227.17

[56] References Cited

U.S. PATENT DOCUMENTS 4,759,624  7/1988  Calvani et al. .................. 356/73.1
4,840,482  6/1989  Shigematsu et al. .................. 356/73.1

Primary Examiner—Vincent P. McGraw
Attorney, Agent, or Firm—Foley & Lardner

[57] ABSTRACT

A technique for identifying an optical transmission medium from a plurality of single-mode-type optical transmission media by using longitudinal middle portions of the media as an identification section by first exciting a particular optical transmission media by means of a polarized light, next applying either an electromagnetic action or a mechanical action to the particular optical transmission medium to modulate the polarized light and then identifying the particular optical transmission medium based on the deviation of the polarized plane of the polarized light.

8 Claims, 5 Drawing Sheets

METHOD AND APPARATUS FOR IDENTIFYING AN OPTICAL TRANSMISSION MEDIUM

BACKGROUND OF THE INVENTION

1. Field of the Invention

This invention relates to a method and an apparatus for identifying an optical transmission medium and to an apparatus for identifying the same as well as to a method for optical telecommunication.

2. Description of the Prior Art

In the course of recent developments in telecommunication networks, a large number and a wide variety of telecommunication cables have been and are being laid in tunnels, conduits and ducts in building sites often in the form of bundles.

Such installations normally also contain power transmission cables whose external view resembles that of telecommunication cables.

When, for example, a specific cable has to be branched at a point somewhere in the middle thereof, the cable has to be identified in the first place at the point of branching.

Although the process of identification may seem very simple since a cable can be identified by introducing light from an end of the cable and detecting the light coming out from its other end, an operator for the branching operation positioned at the point of branching somewhere in the middle of the cable can not simultaneously see the incoming light end and the outgoing light and of the cable particularly when the cable is considerably long.

As far as metal cables for power transmission are concerned, there has been proposed a method for identifying a particular cable out of a bundle of cables by using a search coil.

With this method of identification, the magnetic field generated outside of a live metal cable is detected by a coil.

This technique can be advantageously used as it is a noncontact method for singling out a live metal cable out of a bundle of cables installed together.

However, the above technique is effective only in identification of a metal cable and it cannot be applied for identifying an optical fiber cable (nonmetal cable) that does not generate a magnetic field from without.

Thus there has been proposed, for identification of coated optical fibers, a so-called local detection method, which will be described below.

Each of the coated optical fibers, including the one to be detected, can be identified at its ends.

Therefore, in the local detection method, a given optical signal is introduced at an end of the optical fiber cable into the coated optical fiber which is assumed to be the right one for branching at a point in the middle of its longitudinal direction and then each of the coated optical fibers within the cable sheath is partially exposed and bent at the point.

Under these conditions, the optical fiber into which light has been introduced leaks the light (in a radiation mode) from the bent area. So, the optical fiber in question can be identified by detecting the source of the leaked light.

A telephone line is often used on sites of installing or repairing optical fiber cables for communication between workers.

When an optical fiber cable contains metal wires, any such wires may be utilized for telephone communication.

However, if the optical fiber cable to be laid is a nonmetallic cable that does not contain any metallic wires or if the optical fiber cable contains metallic wires but any of them can not be suitably used for telephone communication, a coated optical fiber is used as a telephone line, to which optical telephone sets are connected.

While the above described local detection method may be used when the cable sheath of an optical fiber cable can be partially peeled off and a particular optical fiber can be detected out of a number of optical fibers contained in it, the method may not be successfully used particularly when a large number of optical fiber cables are laid in parallel and a particular optical fiber can not be detected without peeling off all the sheath of the cables.

Besides, the process of peeling off, if partially, the sheath of an optical fiber cable in this method entails damage to the cable and that of bending the optical fiber cable can be accompanied by possible deterioration of the transmission characteristics of the cable, which in turn results in bit errors particularly when the cable is in live condition and actually being used.

The light signals for telephone communication are transmitted from and received at the ends of the coated optical fiber by the optical telephone sets.

While the optical telephone sets have to be connected to both ends of the coated optical fiber for telephone communication, such connection can not be realized when there are no cuttable coated optical fibers or when all the work for connection of the optical fiber cable has been completed.

If optical telephone communication has to be established under these circumstances by using one of the coated optical fibers of the cable, the selected fiber should be cut and optical telephone sets should be connected to the fiber at both ends, entailing a troublesome operation to be performed.

SUMMARY OF THE INVENTION

In view of the above mentioned technological problems, it is therefore the object of the present invention to provide a method and an apparatus for identifying a particular optical transmission medium without damaging the optical fiber cable in which the optical fiber is contained and without adversely affecting the currently busy lines of the cable as well as to provide a method for optical telecommunication that secures the use of an optical transmission line without cutting the same.

According to the invention, the first aspect of the above object is achieved by providing a method for identifying an optical transmission medium out of a plurality of optical transmission media by using longitudinal middle portions of the media as identification section, characterized in that a particular optical transmission medium to be identified is excited by means of the polarized light and said polarized light is modulated by applying either an electromagnetic action or a mechanical action to the particular optical transmission medium to be identified at said identification section so that said particular optical transmission medium can be identified by the deviation of the polarized plane of the polarized light.

The second aspect of the above object is achieved by providing an apparatus for identifying an optical transmission medium characterized in that it comprises a transmitting/receiving station provided with a light source to be used for exciting said optical transmission medium by the polarized light and a light-receiving section for polarized light with a shifted wave plane for receiving the polarized light transmitted through the optical transmission medium and means for externally applying an electromagnetic or mechanical action to the optical transmission medium at a longitudinally intermediate portion of said optical transmission medium, The third aspect of the above object is achieved by providing a method for optical telecommunication, characterized in that either an electromagnetic or mechanical action obtained by modulating a data signal is applied to an optical fiber excited by the polarized light to modify said polarized light and the modification is detected to demodulate said data signal.

With the method of identifying an optical transmission medium according to the invention, longitudinal middle portions of a plurality of optical transmission media installed in parallel are used as identification section and a particular optical transmission medium is identified in that section in a manner as described below.

Since each of said optical transmission media, including the one to be detected at the longitudinally intermediate portion (identification section), can be identified at its ends, the optical transmission medium in question is excited at one of its ends by the polarized light.

In other words, a given optical signal is introduced into the optical transmission medium in question at an end of the bundle of the optical transmission media.

As the light signal enters into the optical transmission medium in question, each of the optical transmission media is subjected to an electromagnetic or mechanical action at the identification section.

Under this condition, the polarized light that has been introduced from an end of the optical transmission medium to be detected at the middle is modulated by said action and the modulated polarized light is detected at the other end.

To the contrary, all the optical transmission media other than the optical transmission medium to be identified or those that have not been excited by the polarized light do not show any fluctuation in the state of transmission.

Therefore, the operator at the identification section can identify the optical transmission medium by communicating over telephone with his or her colleagues at the two ends of the medium each time he applies said action to one of the optical transmission media to check if it shows modulation of the polarized light until the optical transmission medium in question is identified as it shows modulation of the polarized light at the light-receiving end of the medium and the operator at that end notifies the detection of the modulation of the polarized light.

Since an apparatus for identifying an optical transmission medium according to the invention comprises a transmitting/receiving station provided with a light source and a section for receiving light for polarized light with a shifted wave plane and means for externally applying a given action to the optical transmission medium, it can satisfactorily apply said identifying method to any optical transmission media.

The method for optical telecommunication according to the invention applies an electromagnetic or mechanical action obtained by externally modulating a data signal to an optical fiber excited by the polarized light at a longitudinally intermediate portion of said optical fiber.

For example, when an optical fiber is excited by applying a timbre-modulated ultrasonic wave, the polarized light running through the optical fiber is modified and the modified light is detected at the outgoing end of the optical fiber.

Therefore, optical telecommunication can be realized between a longitudinally intermediate portion and the outgoing end of an optical fiber by detecting the changes in the linearly polarized light at the outgoing end of the optical fiber and demodulating it to voice signals.

The local detection method may be effectively used for taking out light signals being transmitted through an optical fiber at a longitudinally intermediate portion of the fiber.

Namely, light signals can be taken out from the optical fiber by bending it at a longitudinally intermediate portion so that data can be transmitted from an end to the intermediate portion of the optical fiber.

This method does not require the optical fiber to be cut at the middle.

BRIEF DESCRIPTION OF THE DRAWINGS

FIG. 11 is a schematic illustration of a lightreceiving section to be used with the method of optical telecommunication of FIG. 10 when only one optical fiber is involved; and.

DESCRIPTION OF THE PREFERRED EMBODIMENTS

Now the method as well as an apparatus for identifying an optical transmission medium according to the present invention will be described in greater detail by referring to the accompanying drawings that illustrate preferred embodiments of the invention.

Figure 1:
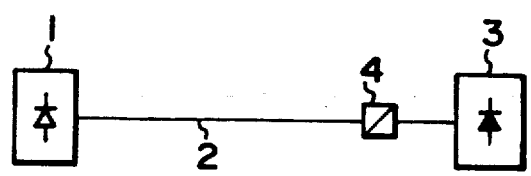
FIG. 1 is a diagram illustrating the principle of shifting the plane of a polarized wave.

FIG. 1 illustrates the principle of an optical system that provides the basis for the method of identifying an optical transmission medium according to the invention.

In the optical system of FIG. 1, a laser beam from light source (LD) 1 is introduced into a single-mode-type optical fiber 2 and the outgoing light is detected by a photodetector 3 and then its intensity is measured by an analyser 4 connected thereto.

With the arrangement of FIG. 1, the power of the detected outgoing light will be fluctuated in accordance with the shift of the plane of polarized wave.

The electric field of the light at the outgoing terminal of the optical fiber before it is led to the analyser 4 is expressed by equations (1) and (2) below.

$$E_x = a_x e^{j\omega t} \cdot e^{j\delta} \quad (1)$$

$$E_y = a_y e^{j\omega t} \quad (2)$$

wherein $a_x, a_y$: amplitude along x-axis and y-axis,
$\delta$: phase difference at x-axis and y-axis, and
$\omega$: angular frequency.

Power P of the outgoing light along an assumed x-axis with angle $\theta$ of the principal axis will be expressed by equation (3) below, when detected by analyser 4.

$$P(\theta) = a_x^2 \cos\theta + a_y^2 \sin\theta + 2a_x a_y \cos\theta \cdot \sin\theta \cdot \cos\delta \quad (3)$$

Thus, the power of the received light is a function of angle $\theta$ of the main axis.

Angle $\phi$ of rotation of the polarized light brought forth by a magnetic field is theoretically expressed by equation (4) below.

$$\phi = v \cdot H \cdot l \cdot \cos\psi \quad (4),$$

wherein $v$: Verdet's constant (rad/m),
$H$: magnetic field (AT/m),
$l$: length of the optical fiber (m), and
$\psi$: angle between the magnetic field and the optical fiber (deg)

For wavelengths of 1300 nm and 1550 nm, the Verdet's constant will respectively take the following values.

1300 nm: $1.10 \times 10^{-6}$ (rad/m)
1550 nm: $0.77 \times 10^{-6}$ (rad/m)

Figure 2:
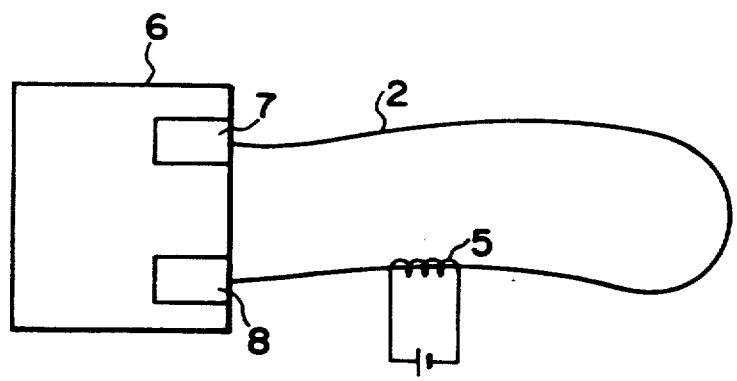
FIG. 2 is a schematic illustration of an instrument used for an experiment carried out for the purpose of the present invention.
Figure 3:
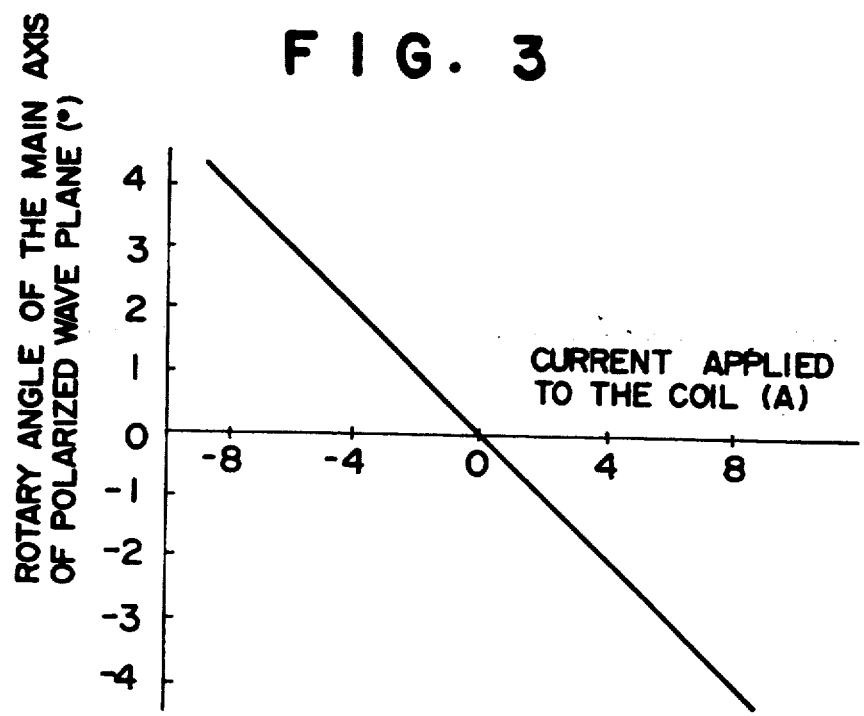
FIG. 3 is a graphic illustration showing the relationship between the applied electric current and the angle of rotation of the main or principal axis of the plane of a polarized wave.

FIG. 2 illustrates the relationship between the current applied to the coil and the angle of rotation of the principal axis of the polarized wave plane of coherent light passing through optical fiber 2 caused as a result of the Faraday effect obtained in an experiment conducted by using an arrangement as illustrated in FIG. 2, which is constituted by a coated optical fiber 2 with an outer diameter of 0.04 mm$\phi$, a magnetic-field-applying device 5 as means for rotating linearly polarized light and an instrument 6 for measuring the degree of polarization comprising a light-emitting section 7 and a light receiving section 8.

A deviation of the polarized plane of the polarized light passing through an optical fiber caused by an external force such as mechanical vibration can be explained in the following manner.

An external force such as mechanical vibration brings the optical fiber under stress and generates a photoelastic effect that gives rise to a partial double refraction in the area of the optical fiber under stress. The electric field vectors of the light passing through a single-mode optical fiber prior to the application of stress which is a function of signal are expressed by equation (5) below, while the intensity of the light is expressed by equation (6).

$$ex = A \cos\omega t$$

$$ey = A \cos\omega t \quad (5)$$

wherein A: amplitude.

$$Ii = 2A^2 \quad (6)$$

Note that the angle of incidence of the polarized light is assumed to be 45° relative to both the X- and Y-axes for simplification of explanation.

Then the photoelastic effect generated by the external stress brings forth a difference of refractive index equal to $|nx - ny|$ in orthogonal directions on a sectional plane of the optical fiber as well as a phase difference equal to $\gamma$ in the orthogonal components of the electric field. Consequently, the polarized plane is modulated to produce an elliptically polarized light.

Then the intensity of light Io of the output of the analyser in y-direction will be expressed as follows.

$$Io = 2A^2 \sin^2(\gamma/2) \quad (7)$$

Thus the ratio of the intensity of the light outgoing from the analyser to that of the incoming light will be expressed by the following equation.

$$Io/Ii = 2A^2 \sin^2\gamma/2 \quad (8)$$

If the stress is applied by means of a piezo-electric device, the phase difference will be given by the following formula.

$$\gamma = \pi/2 + \gamma m \sin\omega mt \quad (9)$$

wherein $\pi/2$: phase difference bias, $$m = \pi(Vm/V\pi),$$

Vm sin$\omega$t: drive voltage of the piezo-electric device and V$\pi$: applied voltage that makes the optical phase difference equal to $\pi$.

The following equation is derived from equations (8) and (9).

$$Io/Ii = \sin^2\{\pi 4 + (\gamma m/2) \sin\omega mt\} \quad (10)$$
$$= \{1 + \sin(\gamma m \sin\omega mt)\}/2$$

If $m \ll 1$, formula (6) will be also expressed as follows.

$$Io/Ii = \{1 + \gamma m \sin\omega mt\}/2 \quad (11)$$

It will be seen that a light with an intensity modulated proportionally to the drive voltage applied to the piezo-electric device is obtained.

Figure 4:
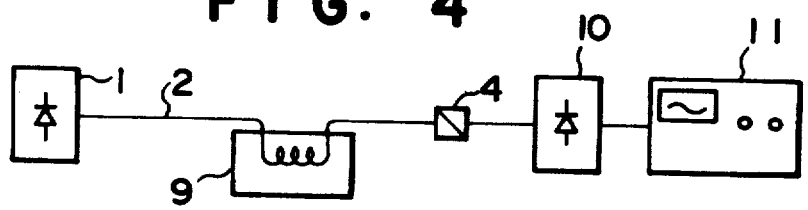
FIG. 4 is a schematic illustration of another instrument used for another experiment carried out for the purpose of the present invention.
Figure 5:
FIG. 5 is a graphic illustration showing the fluctuation of the power output when an ultrasonic wave is applied to the experiment of FIG. 4.

In another experiment, where an arrangement as illustrated in FIG. 4 and constituted by a coated optical fiber 2 with an outer diameter of 0.04 mmφ, an ultrasonic-wave-applying device 9 as means for deviating the plane of polarized light, a light/electricity converter (O/E) 10 and an oscilloscope 11 connected downstream to an analyser 4 was used and a vibration of 40 kHz was applied to the optical fiber 2 from the ultrasonic-wave-applying device 9, the power of the light received by way of the analyser 4 showed a fluctuation as illustrated in FIG. 5.

Next the identifying method and a preferred embodiment of the identifying apparatus of the invention realized on the basis of the principle illustrated in FIG. 1 will be described by referring to FIG. 6.

Figure 6:
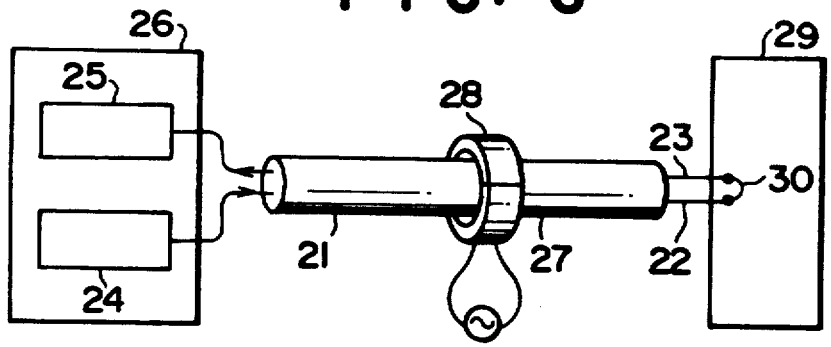
FIG. 6 is a schematic illustration of the method for identifying an optical transmission medium and a first embodiment of the apparatus for identifying the same.

It may be assumed that an optical transmission medium 21 of FIG. 6 is installed in a tunnel, a conduit or a duct in a building (not shown).

The optical transmission medium 21 may be a coated optical fiber, a single core optical fiber cable, a multi-core optical fiber cable or any cable comprising mainly optical fibers and the optical fiber under consideration of the optical transmission medium 21 may be, for instance, a single-mode type optical fiber.

It should be noted, however, that the optical transmission medium 21 schematically shown in FIG. 6 comprises an optical fiber cable 22 for input purposes and an optical fiber cable 23 for output purposes.

In FIG. 6, a light source 24 for transmitting light signals into the optical transmission medium 21 may be a laser diode that generates coherent light and a light-receiving section 25 for polarized light with a shifted wave plane is realized by combining a known analyser and electric as well as electronic devices.

The light source 24 and the light receiving section 25 for polarized light with a shifted wave plane are installed within a transmitting/receiving station 26.

In the transmitting/receiving station 26, the light source 24 is mutually connected with the input terminal of the optical fiber cable 22 for input purposes and the light-receiving section 25 for polarized light with a shifted wave plane is mutually connected with the output terminal of the optical fiber cable 23 for output purposes.

In FIG. 6, an identification section 27 is arranged at a longitudinally intermediate portion of the optical transmission medium 21.

Also in FIG. 6, a magnetic-field-applying device 28 is arranged for applying a magnetic field to the optical transmission medium 21 from outside of said optical transmission medium 21.

The magnetic-field-applying device 28 is so designed that the intensity of the magnetic field applied to the optical transmission medium 21 as well as the frequency of application of magnetic field can be varied and consequently the linearly polarized light can be modulated through such operations of varying the intensity of magnetic field as well as the frequency of application as described later.

The magnetic-field-applying device 28 is juxtaposed with the identification section 27 on the optical transmission medium 21.

Since currently available optical communication systems are based on the intensity modulation/direct detection technique, application of a magnetic field to busy lines (optical fiber cables) by means of a magnetic-field-applying device 28 and any fluctuation of the polarized wave due to such application do not interfere with the communications which are current in the optical fiber cables.

In relay station 29 in FIG. 6, the optical fiber cable 22 for input purposes and the optical fiber cable 23 for output purposes are connected with each other by way of an optical fiber cable 30 for looping.

With an embodiment as illustrated in FIG. 6, a particular optical transmission medium 21 is singled out from a plurality of optical transmission media in the following manner.

A laser beam (linearly polarized light) emitted from the light source 24 of the transmitting/receiving station 26 is introduced into the optical fiber cable 22 and then passes through the optical fiber cables 30 and 23 before it is received by the light-receiving section 25 for polarized light with a shifted wave plane.

While the beam proceeds through the optical fiber cables, a magnetic field is externally applied to the optical transmission medium 21 by means of the magnetic-field applying device 28.

In the optical transmission medium 21 to which a magnetic field is applied, the intensity and the phase of the linearly polarized light is amplitude- or frequency-modulated (hereinafter referred to as AM or FM) so that the principal axis of the light is rotated and the rotation of the axis is detected by the light-receiving section 25 for polarized light with a shifted wave plane.

Since the optical transmission medium 21 in which the polarized plans of the polarized light is being deviated is the one which is subjected to a magnetic field applied from without, the operator at the transmitting-/receiving station 26 notifies his colleague at the identification section 27 by means of a radio or wired communication system of the fact that the optical transmission medium 21 is the one to be identified. Upon receiving the notice, the operator at the identification section 27 can correctly identify the optical transmission medium 21 in question.

Now a variation of the method and a second embodiment of the apparatus of the invention realized on the basis of the principle illustrated in FIG. 1 will be described by referring to FIG. 7.

Figure 7:
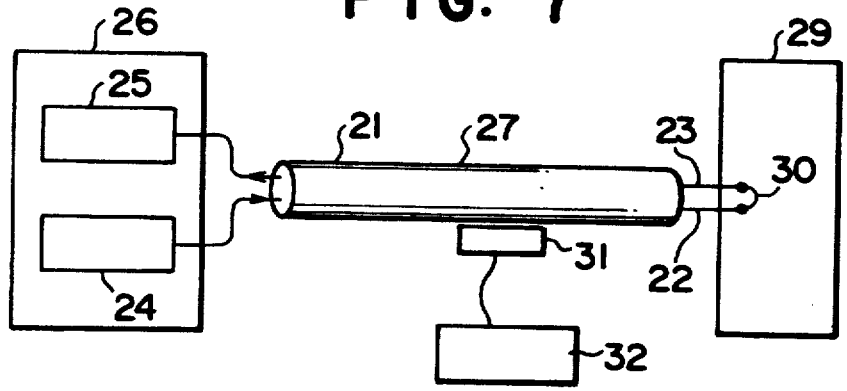
FIG. 7 is a schematic illustration of a variation of the method of FIG. 6 and a second embodiment of the apparatus of the invention.

In the embodiment of FIG. 7, the magnetic-field-applying device 28 of the identification section 27 arranged in a longitudinally intermediate portion of the optical transmission medium 21 in the above described first embodiment is replaced by an ultrasonic-wave-applying device 31 for externally applying an ultrasonic wave to the optical transmission medium 21.

The ultrasonic-wave-applying device 31 is so designed that the amplitude and the frequency of the ultrasonic wave applied to the optical transmission medium 21 can be varied by means of a controller 32. Therefore, the polarized light passing through the optical transmission medium 21 can be modulated by such operation in terms of intensity and phase of the light.

It should be noted that, as in the case of the first embodiment, any fluctuation that may take place in the polarized wave of light as an ultrasonic wave is applied to the busy lines (optical fiber cables) by the ultrasonic-wave-applying device 31 does not adversely affect the communications which are current through the cables.

All the technological aspects of the embodiment of FIG. 7 other than the use of ultrasonic wave are similar to those of the embodiment of FIG. 6.

The embodiment of FIG. 7 is operated for singling out a particular optical transmission medium 21 out of a plurality of optical transmission media in a manner similar to that of the first embodiment and described below.

A laser beam emitted from the light source 24 in the transmitting/receiving station 26 is introduced into the optical fiber cable 22 and then passed through the optical fiber cables 30 and 23 before it is received by the light-receiving section 25 for the polarized light with a shifted wave plane.

While the beam proceeds through the optical fiber cables, an ultrasonic wave is externally applied to the optical transmission medium 21 by means of the ultrasonic-wave-applying device 31 near the identification section 27 and then the intensity and the phase of the linearly polarized light passing through the optical transmission medium 21 is modulated so that the main axis of the light is rotated and the rotation of the axis is detected by the light-receiving section 25 for polarized light with a shifted wave plane. All the other stages of the process of identification are identical with those of the embodiment of FIG. 6.

While a transmitting/receiving station 26 and a relay station 29 are located at the opposite ends of the optical transmission medium 21 in each of the above embodiments of FIGS. 6 and 7, they may be replaced respectively by a transmitting station (light source) and a receiving station (light-receiving section for polarized light with a shifted wave plane) without altering the function of identifying a particular optical transmission medium of those embodiments.

Once a particular optical transmission medium (optical fiber cable) 21 is singled out, the next step may be, for example, the operation of locally removing the cable sheath at a longitudinally intermediate portion, exposing a number of optical fibers that have been coated, to atmosphere and identifying the optical transmission medium to be branched.

The above described method for identifying a particular optical transmission medium can be effectively applied to such operation.

If the optical transmission medium 21 is a coated optical fiber, the coating is removed and then the fiber is bent at the exposed portion so that linearly polarized light may be introduced into the optical transmission medium from the bent area.

If such is the case, the polarized light may be introduced into the optical transmission medium either from an end of the medium or a longitudinally intermediate portion of the medium where the optical fiber is exposed.

Now the method for an optical telecommunication of the invention realized on the basis of the principle of FIG. 8 will be described by referring to FIG. 8.

Figure 8:
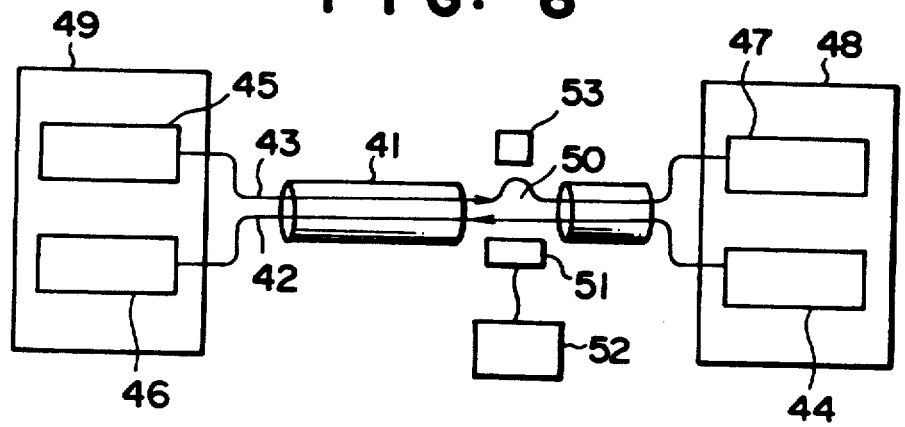
FIG. 8 is a schematic illustration showing the method of optical telecommunication according to the invention.

In FIG. 8, the optical transmission medium 21 is a multi-core optical fiber cable comprising single-mode type optical fibers 42 and 43.

Each of light sources 44 and 45 for emitting light signals respectively for the optical fibers 42 and 43 may be, for example, a laser diode that generates coherent light and light-receiving section 46 for the polarized light with a shifted wave plane for receiving the light coming through the optical fiber 42 may be realized by combining a known analyser and electric and electronic devices, whereas the light-receiving section 47 for receiving the light coming through the optical fiber 43 may be realized by known optical devices.

Of these components, the light source 44 and the light-receiving section 47 are arranged in a station 48, while the light source 45 and the light-receiving section 46 for polarized light with a shifted wave plane are arranged in the other station 49 of the station pair.

The light source 44, the optical fiber 42 and the light-receiving section 47 are connected together in the station 48, whereas the light source 45, the light-receiving section 46 and the optical fiber 42 are connected together in the other station 49.

A work section 50 is located in a longitudinally intermediate portion of the optical transmission medium 41.

The work section 50 is provided with a signal-applying device 51 in juxtaposition with the optical fiber 42 and a light-receiving device 53 in juxtaposition with the other optical fiber 43.

Said signal-applying device 51 may be, for example, such that externally applies an ultrasonic wave to the optical fiber 42 and is provided with a controller 52 as in the case of the ultrasonic-wave-applying device 31 described earlier.

If appropriate, the signal-applying device 51 may be a magnetic field applying device 28 as described earlier.

Communication between the station 49 and the work section 50 of FIG. 8 is established in the following manner.

As a laser beam emitted from the light source 44 of the station 48 is introduced into the optical fiber 42 and received by the light-receiving section 46 for polarized light with a shifted wave plane of the other station 49, an ultrasonic wave obtained by modulating a voice signal is given to the optical fiber 42 by means of the signal-applying-device 51 of the work section 50.

Then, the polarized light passing through the optical fiber 42 is modulated in terms of amplitude and frequency and the modulated signal is received by the light-receiving section 46 for the polarized light with a shifted wave plane.

Upon receiving the signal, the light-receiving section 46 in the receiving station 49 detects the linearly polarized light that has been modulated by the signal-applying device 51 in the work section 52 and demodulates it to the original voice signal.

For receiving signals transmitted from the station 49 at the work section 50, the voice-signal-carrying laser beam which is being emitted from the light source 45 of the station 49, introduced into the optical fiber 43 and received by the light receiving section 47 of the station 49 is taken out at the work section 51 by bending the optical fiber 43 so that the signal-carrying beam is partially leaked therethrough and received by the light-receiving device 53 at the work section 51.

If the voice-signal-carrying beam emitted from the light source 45 has been modulated for voice signals in terms of amplitude and frequency, the voice signals can be reproduced by demodulating the beam received by the light-receiving section 47 in the station 48.

Optical telecommunication will be established in a similar manner, if a magnetic-field-applying device is used for the signal-applying device 51.

When an ultrasonic wave device having an oscillator of 40 kHz and another device having an oscillator of 1 MHz are used and the waves from the devices are separately modulated, the ultrasonic wave from the former device (40 kHz) can be modulated in terms of amplitude of the voice frequency signal while the wave from the latter device (1 MHz) can be modulated in terms of both amplitude and frequency of the voice frequency signal. The upper limit on the signal frequency band may be somewhere around 30 kHz.

It is well known that, when an optical fiber cable is installed as long as 10 km, the polarized wave passing through the cable is weakly fluctuated, or modulated, with time, even if no signal is applied at the work section 50.

Figure 9:
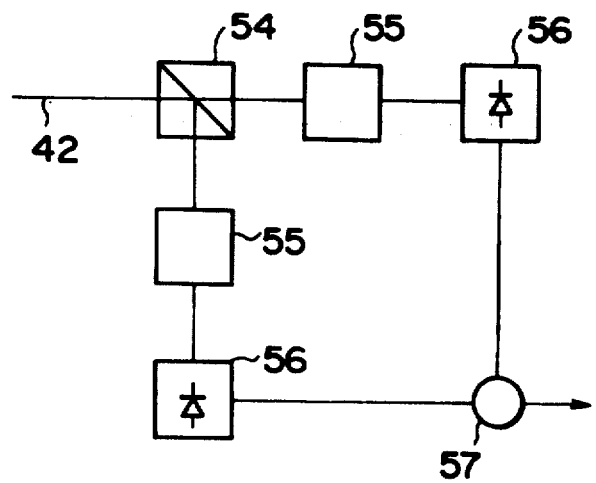
FIG. 9 is a schematic illustration of the beam splitting technique used in the method of optical telecommunication shown in FIG. 8.

If such is the case, an original light signal can be effectively received by using means as illustrated in FIG. 9.

The means shown in FIG. 9 comprises a beam splitter 54 for dividing the light signal transmitted through the optical fiber 42 into two with a phase difference of 90° and the signals obtained by dividing the original signal are introduced into respective analysers 55 arranged on the respective branches of the transmission path and received by the light-receiving device 56 so that the original timbre of the voice is restored by demodulation before the two signals are mixed with each other by a mixing device 57.

In the arrangement of FIG. 8, the light-receiving section 46 for polarized light with a shifted wave plane in the station 49 may be provided with a light path for receiving the light that bypasses the analyser or the light passing through optical fiber may be partly taken cut by means of a wave divider in order to correctly detect and indicate the level of light transmitted from the light source 44 and to conduct an AGC (automatic gain control) without difficulty in the light-receiving section 46 for polarized light with a shifted wave plane.

Besides, the station 48 in FIG. 8 may be provided with a telephone set so that optical telephone communication may be established between the stations 48 and 48 or between either of them and the work section 50 by applying an ultrasonic wave to the two optical fibers 42 and bending both of the optical fibers 42.

In such a case, the stations 48 and 49 that send signals can be identified by using AM carrier waves with frequencies for each of the stations.

Figure 10:
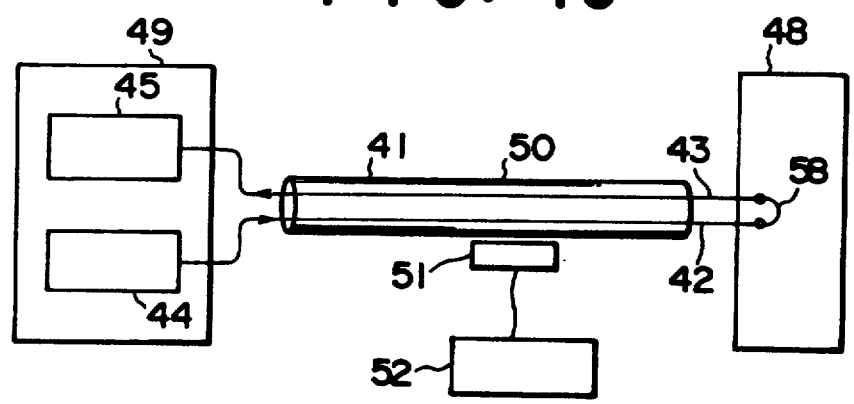
FIG. 10 is a schematic illustration of a variation of the method of optical telecommunication according to the invention.

FIG. 10 shows a variation of the method for optical telecommunication of the invention realized on the basis of the principle illustrated in FIG. 1.

In the arrangement of FIG. 10, the station 49 is a transmitting/receiving station and the other station 48 is a relay station.

In the station 49, there are provided a light source 44 and a light-receiving section 46 for polarized light with a shifted wave plane, which are mutually connected along with the two optical fibers 42, 43, whereas the optical fibers 42, 43 are connected together by way of a loop-forming optical fiber 58.

Such a system can be conveniently and economically utilized, since both the transmitting means and the receiving means can be installed in a same station (station 49) and any alterations to the system can be effected without touching the relay station 48. Moreover, this system improves workability, because the light source and the light-receiving section may be placed on an end.

With an arrangement as illustrated in FIG. 10, telecommunication between the station 49 and the work section 50 is established in the following manner.

An AM optical signal is transmitted from the station 49 by way of a line constituted by the optical fibers 42, 58 and 53 and the transmitted AM optical signal is received at the work section 50 by bending the optical fiber 42 or 43.

Then, at the work section 50, a FM modulation signal is applied to the optical fiber 42 by means of the signal-applying device 51 and the transmitted FM signal arriving by way of the optical fibers 42, 58 and 43 is received by the light-receiving section 46 for polarized light with a shifted wave plane.

Now optical telecommunication is established between the station 49 and the work section 50.

Figure 11:
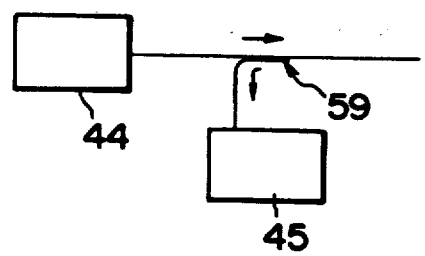

If the arrangement of FIG. 10 is so modified that the light-receiving section 46 for polarized light with a shifted wave plane is connected to the optical fiber 42 by way of a coupler 59 as illustrated in FIG. 11, an optical telecommunication can be realized by way of a single optical fiber.

Figure 12:
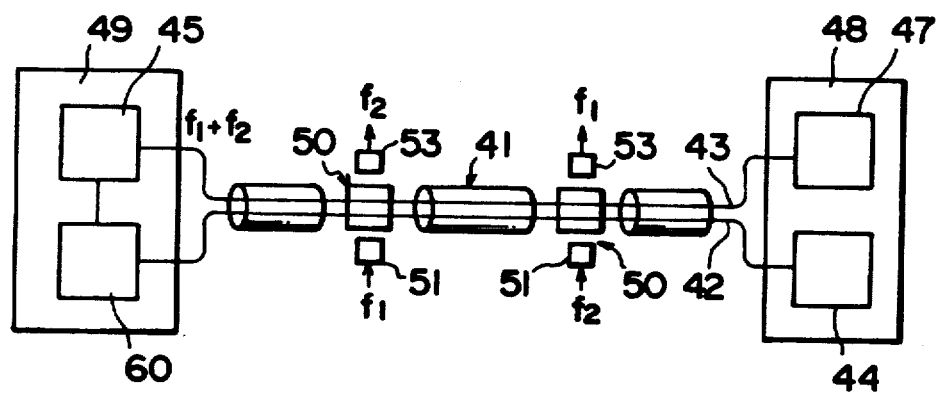
FIG. 12 is a schematic illustration of another variation of the method of optical telecommunication according to the invention.

FIG. 12 shows still another variation of the method for optical telecommunication of the invention realized on the basis of the principle illustrated in FIG. 1.

In the modified arrangement of FIG. 12, a plurality of work sections 50 are located along the longitudinal direction of the optical fiber cable 41 with a space provided between any two adjacent work sections, a signal applying device 51 and a light receiving device 53 being provided at each work section 50.

It should be noted that the light receiving section 46 for polarized light with a shifted wave plane in the station 49 is replaced by a light receiving section 60 which is similar to the light receiving section 47.

Again with the arrangement of FIG. 12, bidirectional communication can be established between the stations or one of the stations and any of the work sections by allocating different frequencies to the work sections so that each of the ultrasonic waves to be applied to the optical fiber 42 by the signal applying devices 51 may be identified through the difference of frequency.

If any two work sections 50 are required to communicate with each other, the communication may be realized by receiving the signal from either of the work sections at the light-receiving section 60 of the station 49 and demodulating the signal into voice signal, which is then applied to the light source 45, so that the synthesized signal obtained by adding the voice signal may be received by the other work section.

The optical communication method of the invention, including its variations as described above, may be adapted for data transmission from either station to a work section 50.

Such data transmission may be useful, for example, when the loss of signal level at a site of connecting optical fibers can be significant and therefore should be monitored by means of QTDR (Optical Time-Domain Reflectometry) located at either station. The obtained data on the loss may be then transmitted to the related work section 50 and displayed on a display screen.

Then, the work section 50 in question can carry out the operation of connecting optical fibers without difficulty and with an improved accuracy.

Switching from an operation of connecting two specific optical fibers to that of connecting one of the optical fibers and an OTDR instrument for monitoring at either station may be remotely controlled from the work section 50.

For such remote control operation, signals other than voice signals may be used by shifting the frequency of the ultrasonic carrier wave (to be used for application of signals).

The method of optical telecommunication according to the invention may be used with hermetically coated optical fibers without problem, because an ultrasonic wave is externally applied to the polarized light running within an optical fiber.

The above described features of the method of the optical telecommunication according to the invention will hold good when a magnetic-field-applying device is used as signal-applying device 51.

The method for identifying an optical transmission medium and an apparatus for identifying the same according to the invention bring forth the following effects.

(1) Because either an electromagnetic action or a mechanical action is externally aplied to an optical transmission medium, there is no need of peeling off a part of the coating of the optical transmission medium to cause it to leak the light passing therethrough and therefore it is free from being damaged.

(2) Because no operation is required for peeling off the coating of related optical transmission media, the operation of identifying a particular optical transmission medium can be carried out with ease.

(3) Because the operation of identifying a particular optical transmission medium does not affect any live lines, it can be carried out without interfering with the current communications.

The method of optical telecommunication according to the invention has the following effects.

(1) Because either an electromagnetic action or a mechanical action is externally applied to an optical fiber, there is no need of cutting the optical fiber to establish an optical telecommunication line. Therefore the method can be effectively used for branching the line after it has been established and for completing the final stage of an operation of connecting optical fibers.

(2) Because a plurality of signal-applying devices may be arranged along an optical fiber and the signals from the devices can be identified at the receiving station, if the signals from different devices carry different frequencies, the method can be effectively applied for various telecommunication purposes.

We claim:

1. A method for identifying an optical transmission medium out of a plurality of single-mode-type optical transmission media by using longitudinal middle portions of the media as an identification section, comprising the steps of:
   exciting a particular optical transmission medium to be identified by means of a polarized light;
   applying either an electromagnetic action or a mechanical action to the particular optical transmission medium to be identified at said identification section to modulate said polarized light; and
   identifying said particular optical transmission medium based on the deviation of the polarized plane of said polarized light.

2. A method for identifying an optical transmission medium according to claim 1, wherein said plurality of optical transmission media are either optical fiber cables or coated optical fibers.

3. A method for identifying an optical transmission medium according to claim 1, wherein either an end portion or a longitudinally intermediate portion of the optical transmission medium to be identified is used as an optical excitation section, said longitudinally intermediate portion being located at a section away from said identification section.

4. A method for identifying an optical transmission medium according to claim 1, wherein the polarized light is reflected at an end portion, said end portion being a portion other than a portion to be used as an optical excitation section, and detected by a photodetector and an analyzer arranged in the optical excitation section as said light proceeds along the optical transmission medium to be identified.

5. A method for identifying an optical transmission medium according to claim 1, wherein said mechanical action is ultrasonic vibration.

6. A method for identifying an optical transmission medium according to claim 1, wherein the deviation of the polarized plane of the polarized light detected in the optical excitation section is transferred to the optical identification section by way of a radio or optical fiber transmission channel.

7. A method for identifying an optical transmission medium according to claim 1, wherein data acquired by the optical identification section is converted into an electromagnetic action modulated by a carrier wave with a given frequency or a mechanical action, said action being applied to the optical transmission medium to be identified and said deviation of the polarized plane of the polarized light being detected by said optical excitation section so that said data being transferred from said optical identification section to said optical excitation section.

8. An apparatus for identifying a single-mode-type optical transmission medium comprising:
   a transmitting/receiving station provided with a light source to be used for exciting said optical transmission medium by the polarized light;
   a light-receiving section with a variable polarization plane for receiving the polarized light transmitted through the optical transmission medium; and
   means for externally applying an electromagnetic or mechanical action to the optical transmission medium at a longitudinally intermediate portion of said optical transmission medium.

* * * * *